United States Patent [19]

Regnier et al.

[11] 3,920,914

[45] Nov. 18, 1975

[54] DIVIDED TIME-DIVISION SWITCHING NETWORK

[75] Inventors: Albert Regnier, Issy-les-Moulineaux; Bernard Jean Jacques Canceill, Paris; Kevork Kevorkian, St. Germain-en-Laye; Jean Paul Lager, La Celle St. Cloud, all of France

[73] Assignee: International Standard Electric Corporation, New York, N.Y.

[22] Filed: Apr. 11, 1973

[21] Appl. No.: 350,053

[30] Foreign Application Priority Data

Apr. 11, 1972 France ............................ 72.12633

[52] U.S. Cl. ........................ 179/15 AT; 179/15 AQ

[51] Int. Cl. ................................................ H04j 3/00

[58] Field of Search ...... 179/15 AQ, 15 AT, 15 AL, 179/ 15 BS, 15 BM, 18 GF, 18 EA, 18 ES, 18 J

[56] References Cited

UNITED STATES PATENTS

| | | | |
|---|---|---|---|
| 3,638,193 | 1/1972 | Opferman | 340/172.5 |
| 3,674,938 | 7/1972 | Jacob | 179/15 AQ |
| 3,694,580 | 9/1972 | Inose | 179/15 AQ |
| 3,700,819 | 10/1972 | Marcus | 179/15 AQ |
| 3,718,769 | 2/1973 | Jacob | 179/18 J |
| 3,736,381 | 5/1973 | Johnson | 179/15 AQ |
| 3,737,586 | 6/1973 | Johnson | 179/15 AQ |
| 3,752,931 | 8/1973 | Verstegen | 179/15 AQ |

*Primary Examiner*—Kathleen H. Claffy
*Assistant Examiner*—Joseph Popek
*Attorney, Agent, or Firm*—James B. Raden; Delbert P. Warner

[57] ABSTRACT

A TDM switching network is totally divided into two time-space-time division subnetworks or partially divided into two sub-switches at the space-division switch level. For a communication to be established two free paths are searched and, if available, established, each through a divided subnetwork or sub-switch. Normally the network as a whole is non-blocking while each subnetwork or sub-switch is blocking. If during operation, one subnetwork or sub-switch becomes inoperative due to failure or maintenance, the path through the other one remains operative. If only one path is found available for communication establishment, only one path is established. A validation column in the time-division address memory of each subnetwork is provided for validating one or the other path.

9 Claims, 3 Drawing Figures

DIVIDED TIME-DIVISION SWITCHING NETWORK

BACKGROUND OF THE INVENTION

1. Field of the Invention

The present invention relates to time-division switching networks for transmitting PCM speech signals and, more particularly, to network control systems which are divided at least in part into two separate branches or sub-networks.

2. Description of the Prior Art

Time-division switching networks are well known. Such networks may constitute portions of local or toll exchanges. They are designed for processing a large number of ingoing or outgoing channels and include, at least, a time-division switching stage and a space-division switch. Each time-division stage is formed by parallel independent time-division groups, those groups being connected to the same space-division switch. Each time-division group essentially includes a control memory having a number of lines usually equal to the number of the time-division network elementary times and a speech memory having a number of lines usually equal to the number of group channels. The number of ingoing or outgoing channels in each group is often equal to the number of network elementary times. However, such a number may be different and, in particular, equal to the half of the network elementary time number.

Each space-division switch may include a number of cascaded stages.

It is known that large time-division switching networks may easily be designed as nonblacking networks without requiring a large increase in the component number if compared with a corresponding blocking network.

The security of networks of this type requires duplication which generally is not desired for financial reasons. Therefore, networks divided in parallel branches or independent subnetworks have been designed at least with respect to certain parts of such networks. Such a principle applied to a space-division switch in a large time-division network has been described in the French Pat. application No. 71/36594, corresponding to U.S. Pat. application Ser. No. 291,995, filed Sept. 25, 1972 in the name of A. Regnier, K. Kevorkian and J. P. Lager, now U.S. Pat. No. 3,851,105.

In that case, the independent sub-networks have common inputs and outputs so as to be able to process the traffic by use of load-sharing. Often, for financial reasons, those sub-networks are not designed to be nonblocking and only the network to which they contribute is possibly nonblocking Such a network division makes it possible to insure better operating security without increasing the component number, since a failure in a sub-network blocks only the concerned subnetworks and not the network as a whole.

In case of failure in a sub-network or maintenance people intervening in that sub-network, several solutions are possible. The simplest one consists in dropping all the communications flowing through the concerned sub-network. However, that is not desirable at all because of the demand overloading which may occur.

Another possible solution consists in restoring in the operative sub-network the communications which had been or must be moved by a rearrangement method which permits retrieval of those communications, such a method is relatively and excessively complex.

SUMMARY OF THE INVENTION

To overcome those drawbacks, a purpose of the present invention is to provide a control system for dividing a time-division switching network making it possible to establish simultaneously two interchangeable switching paths, each path being respectively located in a different sub-network.

Thus, in case of a break in a switching path, the communication is transmitted on the other path which avoids any failure for the subscriber provided that the establishment of two paths is possible.

According to a feature of the present invention, there is provided a control system for a time-division switching network, which is in part divided into two parallel, preferably identical sub-networks designed for processing on a load sharing basis, at least in the concerned part, all the communications transmitted by the time-division channels connected to the network, such a network includes first means for reserving a first path for each communication in either of the two sub-networks, second means for reserving to a possible extent a second path for each communication and a sub-network in addition to the first path reserved for that communication in the other sub-network, and third means for selectively authorizing the transmission of a communication by either of the two paths reserved for that communication when they coexist.

According to another feature of this invention, the control system includes in addition fourth means for suppressing the reservation of one of the two paths reserved for and established communications in favor of a communication under establishment, if the communication under establishment has no other available path.

According to another feature of this invention, the control system also includes transfer means associated to the third means for only activating the paths only established in a same sub-network, if necessary, in particular in the case of maintenance people intervening in a sub-network or in the case of failure.

BRIEF DESCRIPTION OF THE DRAWINGS

Other features of this invention will appear more clearly from the following description of an embodiment, the said description being made in conjunction with the accompanying drawings, wherein.

DESCRIPTION OF PREFERRED EMBODIMENTS

Figures 1, 3:
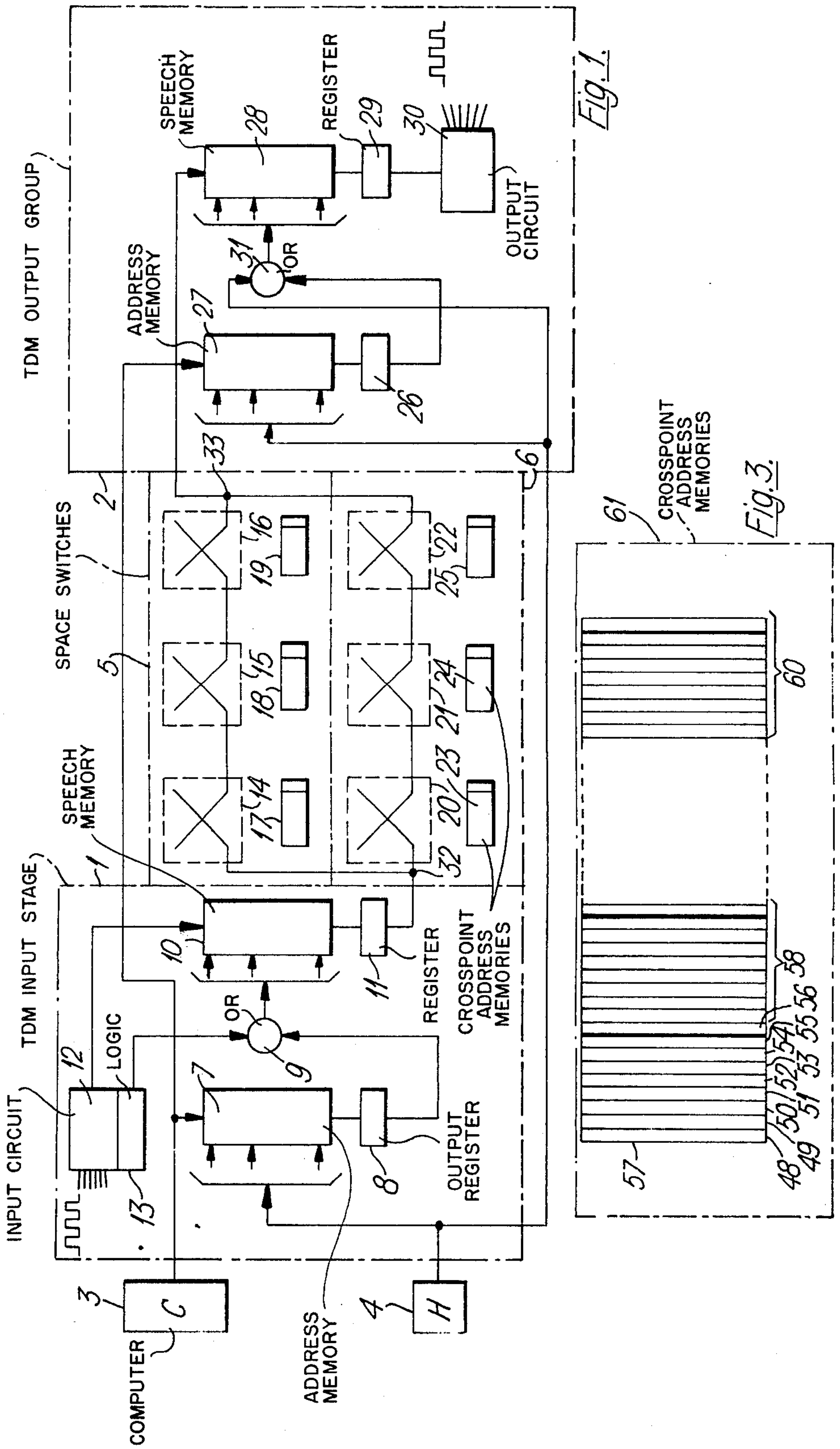
FIG. 1 shows an embodiment of a time-division switching network, partially divided at the level of the space division switch.
FIG. 3 shows a matrix address memory.

In the embodiment shown in FIG. 1, a time-space-time division network has been considered, such an embodiment being not a limitation to the scope of the invention. The network control system is monitored by computers 3 and a clock 4.

The network shown in FIG. 1 is a nonblocking network. It may include, for instance, 64 independent groups of eight junctions, each comprising 32 channels, and is designed for switching 16000 ingoing or outgoing channels. Such a network basically includes an input time-division stage made of groups 1 - with 64 such groups in the described embodiment -, a space division switch that is divided in two sub-switches 5 and 6, and an output time-division stage made of groups 2 - with 64 such groups in the described embodiment -, so that in FIG. 1 appear an input time-division group 1, an output time-division group 2, and the two sub-switches 5 and 6.

Conventionally, each input time-division group comprises a time division address memory 7, a speech memory 10, an input circuit 12 for entering the time-division switching network and a logic circuit 13 for updating the timing on the ingoing channels.

In the described embodiment the time-division switching network input circuit 12 involves eight junctions, each comprising 32 time-division channels, and thus provides multiplexing for 256 channels.

Therefore, the speech memory 10 of group 1 includes 256 rows which may be addressed either from the time-division address memory 7 or from the logic 13, via an OR gate 9. In the described embodiment, the memory 7 includes 512 address rows in such a manner that the network, as a whole, is a nonblocking network. Each row of memory 7 is read out at one of the network elementary times and is loaded by the network processing computers 3. The transfer of the time-division addresses stored in the memory 7 is conventionally transformed via an output register 8 and under control of the exchange clock 4 which the involved network belongs to.

For each channel, the bits are transmitted, via the speech memory 10 to the space-division switch, via a register 11. The register 11 is connected to an input 32, common to the two space division sub-switches 5 and 6, such an input comprising as many liaisons as there are bits to be transmitted in parallel for each operation concerning a communication. In the described embodiment that number is eight.

In the described embodiment, the two sub-networks 5 and 6 comprise 64 inputs and 64 outputs and together constitute a nonblocking space-division switch, each one being theoretically capable of processing all the traffic but each consequently being a blocking network.

In the described embodiment, each sub-network comprises three cascaded stages, i.e. the first stage 14 or 20, the second stage 15 or 21, and the third stage 16 or 22, each comprising eight matrices, each matrix having eight inputs and eight outputs.

Each sub-switch stage has a cross-point address memory or matrix, such as 61 (FIG. 3). That memory has as many rows as elementary times, i.e. 512. It is divided in as many vertical blocks as matrix outputs, i.e. eight. Each block has as many columns, such as 48, as bits necessary for addressing a cross-point which may be connected to that output, and, in addition, a validation column, such as 56, controlling the cross-point operation. The cross-point address memories are loaded via computers 3 and read out under control of the exchange clock 4. Those circuits constitute the main control system circuit as far as the space-division part is concerned.

Each output time-division group 2 has a configuration substantially identical to that of an input group and includes a time-division address memory 27, a speech memory 28 and an output circuit connected to eight junctions of 32 channels.

Each group 2 is connected to an output common to the two sub-switches 5 and 6, that output transmitting the transit bits to the switch memory 28 according to addresses provided from either clock 4 or memory 27, via OR gate 31.

In a conventional manner, the bits constituting the speech sample of a communication established through a time-division channel are received at time t0 via the input circuit 12 which that channel is connected to. The eight bits are sent to the switch memory 10, possibly after timing through the logic 13 and are stored in a row the address of which is stored in the timedivision address memory 7.

At time ***t*1, the bits corresponding to that address are transmitted to OR gate 9 under control of clock 4 so as to address that row of speech memory 10 which stores the speech sample received at time t0. Then the speech sample received at time t0 is transmitted to register 11 for application to output circuit 30** through which it has to transit.

For that purpose, the involved computer 3 has determined in the sub-switches 5 and 6 two free paths and has provided the cross-point address memories with data necessary to address the selected cross-points.

In addition, a validation bit, which is different for each sub-switch, has been supplied to the involved memories, i.e. to memory 17, 18, 19, on the one hand and 23, 24, 25, on the other hand. The cross-points selected in the sub-networks 5 and 6 are addressed and, under control of clock 4, only those cross points are activated the validation memory row of which includes the bit selected for the validation, those points obviously being located in a same sub-network.

The speech sample received in circuit 12 at time t0 is then transmitted, at time t1 via input 32 of the involved group 1, through the cross-points activated in the selected sub-network, for instance 5. That sample is then transmitted through output of network 33 connected to the selected output group 2, wherein it transits via the speech memory 28, the register 29 and the output circuit 30, in accordance to a process close to that defined for the group 1, such a process being well known to people skilled in the art.

In case of failure in one sub-network, or in case of manual intervention in one sub-network, for instance, in case of removing one matrix from sub-switch 5, the communications which were transmitted previously through that sub-switch 5 may be then transmitted through sub-switch 6.

For that result, it is sufficient to inert the validation informations contained in cross-point address memories associated to the cross-points involved in the intervention or failure, which permits to provide the subscribers with a substantial non-stop traffic.

However, usually it is not possible to provide a total nonblocking traffic in a single sub-network, save if this one is a nonblocking network.

For small traffic, it is possible to reserve two paths for each communication and in a failure or intervention concerning a sub-network may be without influence on the traffic.

For large traffic, it may be impossible to reserve two paths for certain communications, each sub-network being possibly designed with internal blocking. In this case, communications through only one path may be authorized to be established. Moreover one of the two paths involved in certain previously established communications may be necessarily released to provide establishment of communications which would have no other possible path.

In that case, if all the traffic is processed by a same subnetwork, those communications which have only one path located in the inoperative sub-network will be normally lost at the interruption time. However, such a number is obviously very small with respect to the number of communications which remain operative.

Figure 2:
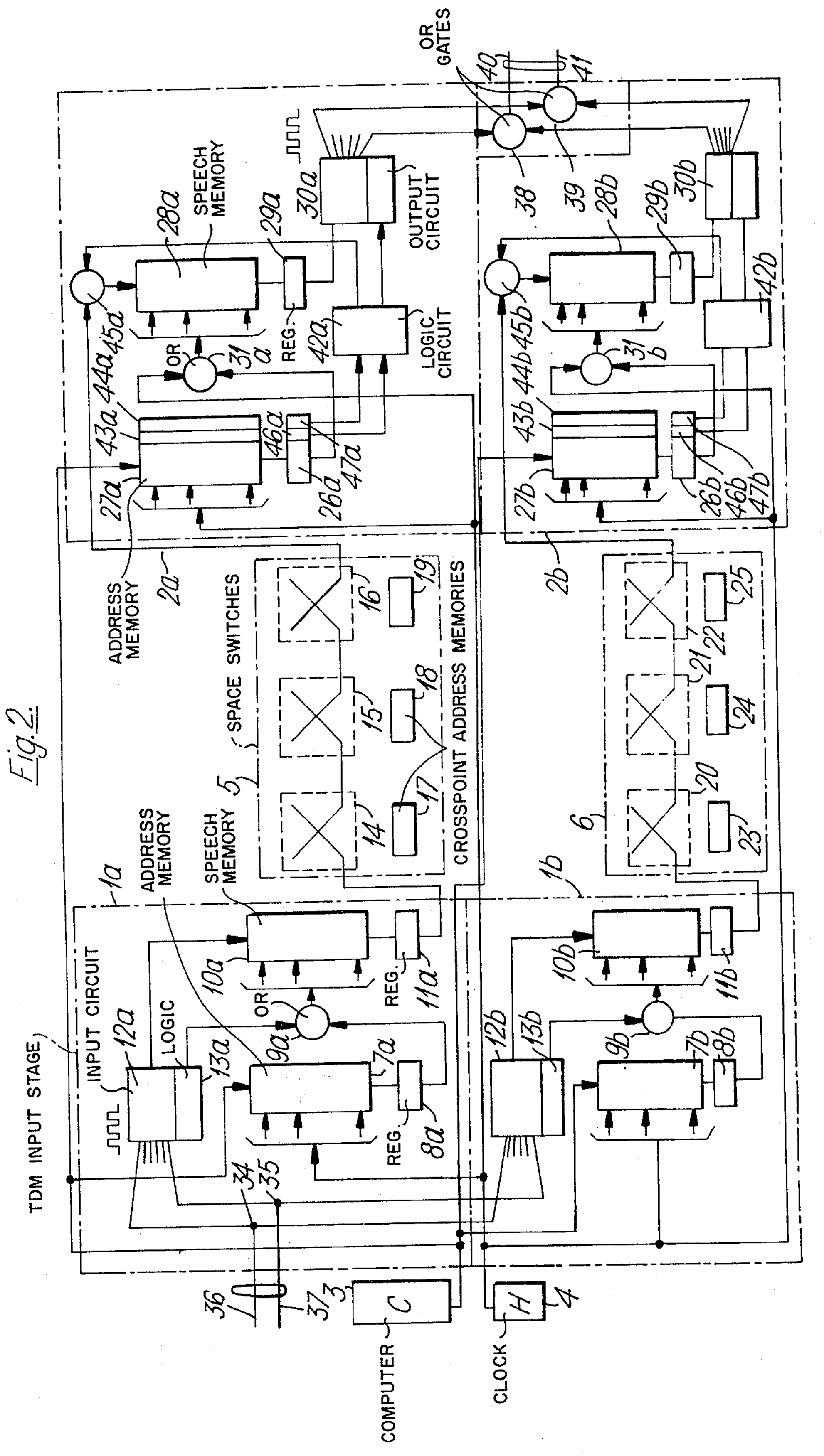
FIG. 2 shows an embodiment of a time-division switching network, divided into two sub-networks having their inputs and their outputs in common respectively.

FIG. 2 illustrates the application of the principle mentioned with reference to FIG. 1, applied to a fully divided time-division switching network.

As previously mentioned, a time-space-time division network has been considered which however is fully divided and comprises two sub-networks, each comprising an input time-division group, an output time-division group and a space-division sub-switch, such as groups 1*a*, 2*a* and sub-switch 5 in the first sub-network and groups 1*b*, 2*b* and sub-switch 6 in the second sub-network.

The two sub-networks have common inputs and common outputs, and as a result, each ingoing or outgoing junction is connected to an input or output of each sub-network, such as ingoing junction 36 connected to common input 34 of groups 1*a* and 1*b* and outgoing junction 40 to output of the common OR circuit 38 of groups 2*a* and 2*b*.

The network, as shown in FIG. 2, is also a nonblocking network designed, for instance, for switching 16000 ingoing channels. It comprises an input time-division stage with 32 groups in each sub-network. Each input time-division group, such as 1*a* or 1*b* comprises a speech memory having 512 rows and designed for multiplexing 512 channels and a time-division address memory having 512 rows.

Each space-division sub-switch, such as 5 or 6 is itself a nonblocking switch in the case of each communication passing through only one path. Each input time-division group in a sub-network is connected to one input of the sub-switch in the same sub-network.

Each sub-switch comprises, for instance, three stages: the first stage such as 14 or 20, includes in the described embodiment, eight four-input eight-output matrices, the second stage, such as 15 or 21, includes eight eight-input eight-output matrices and the third stage, such as 16 or 22, includes eight eight-input four-output matrices.

The outputs of a sub-switch are each connected to an output time-division group of that sub-network, each sub-network comprising in the present embodiment 32 output time-division groups, such as 2*a* or 2*b*.

Each output time-division group comprises a speech memory and a time-division address memory, each having 512 rows. The time-division address memory, such as 27*a* or 27*b* includes, on the one hand, a number of columns corresponding to the number of bits necessary for addressing a speech memory row and, on the other hand, at least an additional column, such as 43*a*. Contents of this column for a given row permits to validate the address information stored in that same row.

Conversely, in this second embodiment, the crosspoint addressing memories of each stage, such as 17, 18, 19 and 23, 24, 25 may comprise no validation column in the various vertical blocks.

Each output group time-division address memory may possibly also comprise an additional column, such as 44*a* providing connection path test possibilities.

Each output group time-division address memory is connected to a logical circuit, such as 42*a* or 42*b*, via a register, such as 26*a* or 26*b*. Thus, those circuits constitute the main components of the control system at the sub-network level.

For that purpose, such a register comprises one or possibly two columns having their outputs connected to the corresponding logical circuit, such as 46*a* and 47*a* to 42*a*.

The output circuit outputs such as 30*a* in each time-division group are each respectively connected to an outgoing junction that each shares with an output of the time-division group in the other sub-network, in such a manner as for the input.

In a conventional manner, the sample bits applied, at time t0, from the junction 36 are simultaneously transmitted to the input circuits 12*a* and 12*b* to the two involved groups 1*a* and 1*b*, via the input 34 common to the two involved groups, because there as many groups 1*a* in a sub-network as groups 1*b* in the other.

In a conventional manner, that sample, received at time t0 is divided in two identical duplicated samples which transit through each of the two groups according to the already described process, under control of computers 3 and clock 4 which constitute the main items of the network control system. At time *t*1, after t0, the first duplicated sample transmitted through the group 1a is read out from the memory to the register 11a. At time *t*2, the second duplicated sample transmitted through the group 1*b*, is read out from the memory 10b to the register 11*b*.

Two paths are established independently and in a conventional manner, one in the sub-switch 5 having an output connected from register 11*a* and the other in the sub-switch 6 having an output connected from register 11*b*. The two duplicated samples, from a same group and received at time t0 are separately transmitted to speech memory 28*a* and 28*b* of groups 2*a* and 2*b* connected to the outgoing junction, such as 40 which will transmit one of the sample to be transmitted.

To do so, the computers 3 send to the time-division address memory 27*a* or 27*b* of each of the two involved groups 2*a* and 2*b*, an individual binary information corresponding to the bits for which they respectively provided the transit.

Each binary information includes, on the one hand, a row address of the speech memory 28, and, on the other hand, a validation bit which is necessarily diifferent for the two memories. The binary information may possibly contain an information to make possible to test the established paths.

The logical circuit 42*a* and 42*b* of the involved groups 2*a* and 2*b* provide the control of the two identical duplicated samples to be transmitted in such a manner as to authorize the transfer of only one of the two duplicated samples.

To do so, each logical circuit is controlled by the contents of the validation cell of the address memory output register to which it is associated, such as 42*a* to 46*a*.

For a first value of that contents, the logical circuit inhibites the inputs of the speech memory to which it is associated at the arrival time of the transmitted sample. Thus the inputs of the memory 28*a* are inhibited by 42*a* at the arrival time of bits received in 12*a* at time t0.

For a second value of the said contents, the logical circuit remains unoperative.

Thus only one of the two duplicated samples is transmitted to the involved outgoing junction, for instance, in the described embodiment to the junction 40, via the associated output circuit and an OR gate associated to that junction, such as 30_a_ and 38 associated to the junction 40.

In a same manner as previously described, if the traffic is low, it is possible to preserve two paths for each communication and any failure or intervention concerning a sub-network may be without influence on to the traffic.

If the traffic is large, it may be impossible to reserve two paths for certain communications. Then the establishment of such communication through only one path is authorized. Moreover it is possible that need occurs to suppress one of the two paths for certain already established communications for providing the establishment of communications which would have no other path available.

The use of an additional validation column in the output group time-division address memories makes it possible to switch all the two-path communications from a sub-network to the other in case of failure or interruption in that sub-network.

According to an alternative of this invention and for simplification purpose, the established paths may be identical in the two sub-networks, which, among other things, permits to have only path search made instead of two.

While the principles of the present invention have been hereabove described, in relation with two specific embodiments, it will be clearly understood that the said description is only made by way of example and does not limit the scope of this invention.

What is claimed is:

1. A time-division switching network arranged in a time-space-time configuration wherein the network is divided in at least one of its parts into at least two, identical, parallel sub-networks for processing on a load sharing basis all the communications transmitted through time-division channels connected to the network, said network including a control system comprising:

first means for reserving a first path for each communication in either of the two sub-networks, second means for reserving a second path for each communication in another sub-network in addition to the first path reserved for that communication in the first sub-network, and third means for selectively authorizing the transit of a communication through either of the two paths reserved to that communication, when two paths coexist.

2. A time-division switching network according to claim 1, wherein the control system comprises means for suppressing the reservation of one of the two paths reserved to an established communication in view of processing a communication under establishment and which has no other available path.

3. A time-division switching network according to claim 1, wherein the first and the second paths reserved to the same communication are identical in their respective sub-networks.

4. A time-division switching network according to claim 1, wherein the control system comprises switching means associated with the third means for activating only the paths established in a same sub-network.

5. A time-division switching network according to claim 1, wherein said at least one of its parts is a space division switch which is divided into two distinct sub-switches having two series of crosspoints between inputs and outputs and having a number of cascaded stages, and said control system further including:

first additional means for simultaneously activating the first and second means so as to simultaneously address the two series of cross-points involved in each path reserved to a same communication in each of the involved sub-switches, and second additional means associated with the third means for selectively activating only one series of crosspoints out of the two series addressed for a same communication.

6. A time-division switching network according to claim 5, wherein the first means includes a plurality of memory elements, that each memory element, enabling the activation of a series of said cross-points which are connected to a same output, comprises a plurality of blocks of columns of memory cells where the number of columns per block is equal to the number of bits needed for addressing one of those crosspoints and at least an additional validation column for controlling the activation of addressed crosspoints in accordance with its own binary contents.

7. A time-division switching network according to claim 1, which is fully divided in two substantially identical, parallel sub-networks which comprises space-division and time-division units and which have common inputs and outputs, wherein the control system comprises:

means, called third additional means, for simultaneously activating the first and second means so as to control for a same speech sample the different time-division and space-division units involved in the establishment of each of the two paths reserved to the communication including that sample, and means, called fourth additional means, associated with the third means for inhibiting the output of one of the two paths concerning a same communication so as to transmit only information transmitted through the other path.

8. A time-division switching network according to claim 7, wherein the control system comprises a time-division address memory in each of the parallel-arranged time-division units, at each sub-network output, such a time-division address memory comprising, on the one hand, a plurality of blocks of columns of memory cells where the number of columns per block is equal to the number of bits needed for addressing, each said column being common to the first and second means, and, on the other hand, an additional column including the transfer authorization binary information for the third means.

9. A time-division switching network according to claim 8, wherein each of the parallel-arranged time-division units connected to each sub-network output comprises an additional column in its associated time-division address memory so as to make it possible to test the various possible paths in the sub-networks.

* * * * *